(12) United States Patent
Rose

(10) Patent No.: US 10,318,571 B2
(45) Date of Patent: *Jun. 11, 2019

(54) PROGRAMMING A DYNAMIC DIGITAL MEDIA QUEUE

(71) Applicant: Google Inc., Mountain View, CA (US)

(72) Inventor: Robert Brett Rose, Boulder, CO (US)

(73) Assignee: Google LLC, Mountain View, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/350,863

(22) Filed: Nov. 14, 2016

(65) Prior Publication Data

US 2017/0060877 A1 Mar. 2, 2017

Related U.S. Application Data

(63) Continuation of application No. 13/764,247, filed on Feb. 11, 2013, now Pat. No. 9,495,455.

(51) Int. Cl.
*G06F 16/43* (2019.01)
*G06F 16/438* (2019.01)
(Continued)

(52) U.S. Cl.
CPC .......... *G06F 16/4387* (2019.01); *G06F 16/43* (2019.01); *G06F 16/489* (2019.01); *G06F 16/951* (2019.01); *G06F 16/9535* (2019.01)

(58) Field of Classification Search
None
See application file for complete search history.

(56) References Cited

U.S. PATENT DOCUMENTS 9,495,455 B2 11/2016 Rose
2008/0294453 A1 11/2008 Baird-Smith et al.
(Continued)

FOREIGN PATENT DOCUMENTS

WO WO-2010093953 A2 8/2010

OTHER PUBLICATIONS

Xinxi Wang et al, "Context-Aware Mobile Music Recommendation for Daily Activities", MM'12, Proceedings of the 20th ACM International Conference on Multimedia, Oct. 29-Nov. 2, 2012, Nara, Japan, pp. 99-108.*

(Continued)

*Primary Examiner* — Uyen T Le
(74) *Attorney, Agent, or Firm* — Shumaker & Sieffert, P.A.

(57) ABSTRACT

A method and/or system for programming a dynamic digital media queue may include receiving, from an electronic device, a request for a digital media queue. The request may comprise request data. In response to the request, a search of one or more events may be performed. The search of the one or more events may be based on a current date, a current location of the electronic device and/or the request data. One or more digital media items may be determined based on the search. A recommended digital media queue may be determined. The recommended digital media queue may comprise one or more recommended digital media items. Recommendation data may be sent to the electronic device. The recommendation data may comprise the recommended digital media queue and one or more reasons explaining why the recommended digital media queue comprises the one or more recommended digital media items.

20 Claims, 4 Drawing Sheets

(51) Int. Cl.
*G06F 16/48* (2019.01)
*G06F 16/951* (2019.01)
*G06F 16/9535* (2019.01)

(56) References Cited

U.S. PATENT DOCUMENTS

| | | | |
|---|---|---|---|
| 2009/0325602 A1* | 12/2009 | Higgins | H04W 4/02 |
| | | | 455/456.2 |
| 2009/0328087 A1* | 12/2009 | Higgins | H04N 7/173 |
| | | | 725/10 |
| 2010/0082448 A1 | 4/2010 | Lin et al. | |
| 2010/0211575 A1* | 8/2010 | Collins | G06F 16/489 |
| | | | 707/749 |
| 2012/0215330 A1 | 8/2012 | Perlmuter | |
| 2012/0221687 A1 | 8/2012 | Hunter et al. | |
| 2012/0224459 A1 | 9/2012 | Rosenshen et al. | |
| 2012/0323938 A1 | 12/2012 | Skeen et al. | |
| 2013/0073686 A1 | 3/2013 | Sandholm | |
| 2014/0180818 A1* | 6/2014 | Mistler | G06Q 30/0259 |
| | | | 705/14.57 |

OTHER PUBLICATIONS

Fredrik Bostrom, "AndroMedia—Toward a Context-aware Mobile Music Recommender", Master of Science Thesis, University of Helsinki, Department of Computer Science, May 9, 2008, 64 pages.*
"Personalized links recommendation based on data mining in adaptive educational hypermedia systems", Romero et al. 2007.
Prosecution History from U.S. Pat. No. 9,495,455, from May 23, 2013 through Jul. 19, 2016, 53 pages.

* cited by examiner

PROGRAMMING A DYNAMIC DIGITAL MEDIA QUEUE

TECHNICAL FIELD

Aspects of the present application relate to processing digital media content. More specifically, certain implementations of the present disclosure relate to a method and/or system for programming a dynamic digital media queue.

BACKGROUND

Various types of electronic devices are now commonly utilized. In this regard, electronic device may include, for example, personal and non-personal devices, mobile and non-mobile devices, communication (wired and/or wireless) devices, general and special purpose devices. Examples of electronic devices may comprise cellular phones, smartphones, tablets, personal computers, laptops and the like. As the use of electronic devices increases, the consumption of digital media content also increases. Users frequently get overwhelmed with digital media content and recommendations for digital media content that do not meet the demands of the users.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for programming a dynamic digital media queue, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
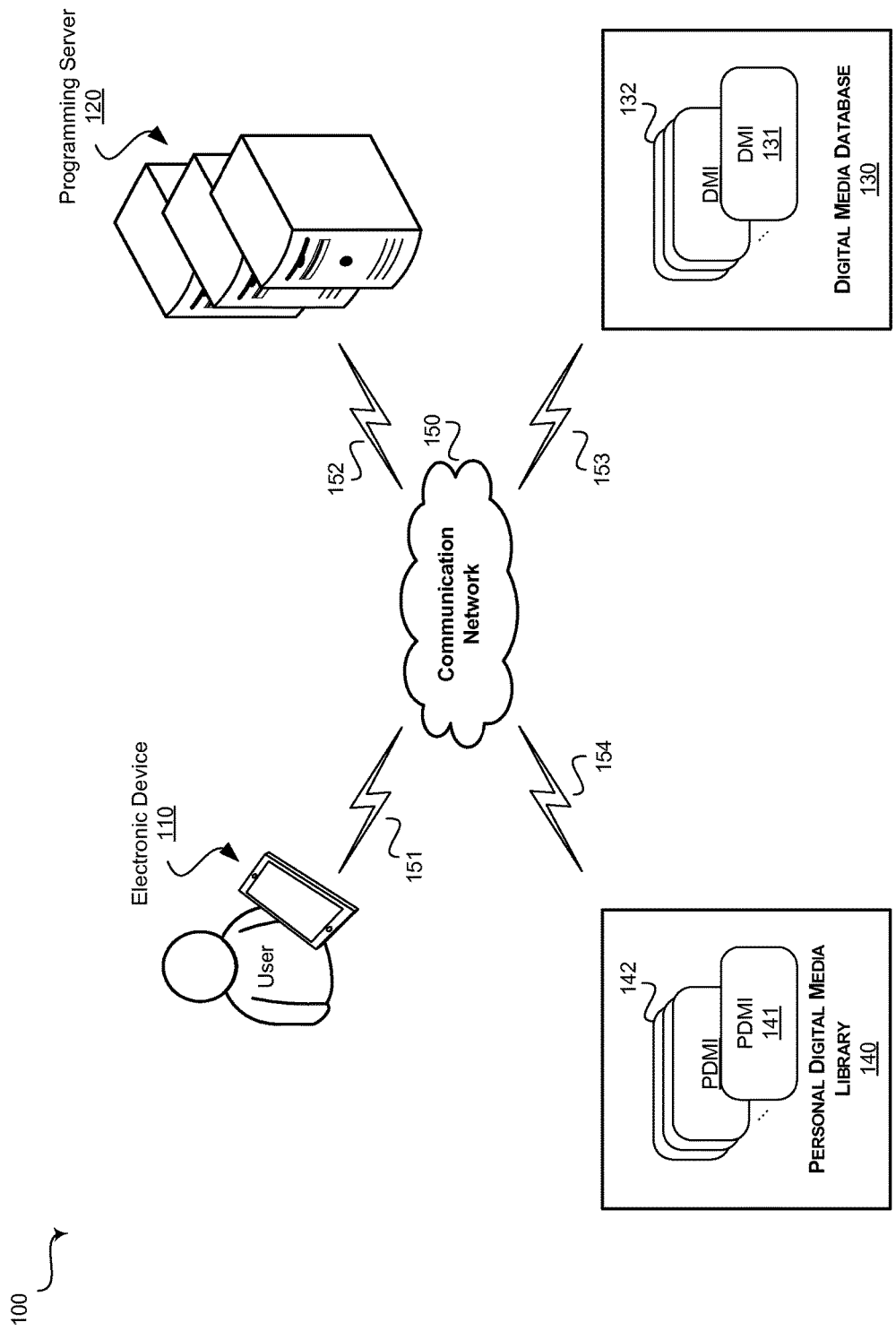
FIG. 1 is a block diagram of an example system for programming a dynamic digital media queue, in accordance with an example embodiment of the disclosure.

Certain embodiments of the disclosure may be found in a method and/or system for programming a dynamic digital media queue. In various embodiments of the disclosure, a method and/or system for programming a dynamic digital media queue may include receiving, from an electronic device, a request for a digital media queue. The request may comprise request data.

In an example embodiment of the disclosure, the request data may comprise data indicative of a current location of the electronic device. In an example embodiment of the disclosure, the request may be generated by the electronic device in response to an occurrence of a pre-defined criterion (e.g., pre-defined user interactions). In another example embodiment of the disclosure, a current location of the electronic device may be determined.

In response to the request, a search of one or more events may be performed. The search of the one or more events may be based on a current date, a current location of the electronic device and/or the request data. The one or more events may be related to birthdates, anniversaries, upcoming concerts, album releases and local news. One or more digital media items (DMIs) may be determined based on the search. A recommended digital media queue may be determined. The recommended digital media queue may comprise one or more recommended digital media items. Recommendation data may be sent to the electronic device. The recommendation data may comprise the recommended digital media queue and one or more reasons explaining why the recommended digital media queue comprises the one or more recommended digital media items. In an example embodiment of the disclosure, the one or more reasons may be based on the current date and/or the current location.

In an example embodiment of the disclosure, the recommendation data may comprise instructions on how to purchase one or more of the one or more recommended digital media items.

In an example embodiment of the disclosure, a particular user associated with the electronic device may be determined. A personal digital media library associated with the user may also be determined. The personal digital media library may comprise one or more personal digital media items (PDMIs). The one or more recommended digital media items may comprise one or more of the one or more personal digital media items.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "block" refers to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

As used herein the term "digital media" and/or "digital media item" may comprise any discrete media object, such as streaming media, audio files, video files, books, magazines, articles, games, slide shows, camera captures, and the like. Such "digital media" and/or "digital media item" may be operable to be played back, displayed, and/or otherwise rendered for user consumption. The "digital media" and/or "digital media item" may comprise an audio and/or video content and/or any suitable digital media content (e.g., AAC, AC3, AEH (ArchosReader), AVI, BBeB (SonyMedia), Complied HTML, DV, Eveda, Flash, KF8, LIT, MIDI, MobiPocket, MPEG, MP3, MP4, PalmMedia, RealAudio, RealVideo, Shockwave, WaveForm, QuickTime).

As used herein the term "metadata" may comprise information and/or attributes related to digital media. Such "metadata" may comprise various information related to digital media, for example, a name, artist name, album, album artist, compositor, composer, year, genre, disc number, track number, duration, comments, artwork and/or other suitable information and/or attributes.

FIG. 1 is a block diagram of an example system for programming a dynamic digital media queue, in accordance with an example embodiment of the disclosure. Referring to FIG. 1, there is shown a system for programming a dynamic digital media queue 100. The system 100 may comprise an electronic device 110, a programming server 120, a digital media database (DMDB) 130, a personal digital media library (PDML) 140, communication network 150 and/or communication links 151, 152, 153 and 154.

The electronic device 110 may comprise suitable logic, circuitry, interfaces, and/or code that may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC). The electronic device 110 may be operable to process, generate, present and/or output data and/or messages. The electronic device 110 may be enabled to perform, run, and/or execute various functions, operations, applications and/or programs based on, for example, user instructions and/or interactions, and/or pre-configured instructions. In this regard, the electronic device 110 may be operable to communicate, for example, with the programming server 120, the digital media database 130 and/or the personal digital media library 140. For example, the electronic device 110 may be enabled to receive one or more digital media items, such as for example, the DMIs 132 and/or PDMIs 142. The electronic device 110 may be operable to render and/or format the DMIs 132 and/or the PDMIs 142 for consumption by a user of the electronic device 110. For example, the electronic device 110 may receive, process and/or present the DMIs 132 and/or the PDMIs 142 to the user as part of services provided by a programming server, such as, for example, the programming server 120. The electronic device 110 may be operable to play the DMIs 132 and/or PDMIs 142 through internal and/or external speakers, and/or headsets.

The electronic device 110 may be operable to run applications that incorporate and/or are operable to access a personal digital media library, such, as for example, the personal digital media library 140. In this regard the electronic device 110 may be operable to provide the user of the electronic device 110 with access to the personal digital media library 140. The electronic device 110 may be operable to detect user interactions (e.g., playing, purchasing, organizing content) with the DMDB 130 and/or the PDML 140. In an example embodiment of the disclosure, the electronic device 110 may, in response to, for example, the user interactions with the DMDB 130 and/or the PDML 140, be operable to request, receive and/or process requests, notifications, data and/or information relating to managing and/or presenting dynamic digital media queues to the user of the electronic device 110 through, for example, a graphical user interface (GUI). The GUI may be operable to present, to the user, contents of the DMDB 130 and/or the PDML 140 and/or the dynamic digital media queues received by the electronic device 110.

The electronic device 110 may comprise a cellular phone, smartphone, tablet, set-top box, television, laptop computer, desktop and/or personal computer, personal media player, other device which may communicate, process, generate, present and/or output data and/or other device that supports consumption of digital media. The disclosure, and/or any implementation(s) in accordance therewith, however, are not limited to any particular type of electronic devices.

The programming server 120 may comprise suitable logic, circuitry, interfaces, and/or code that may be operable to provide digital media services to electronic devices, such as for example, the electronic device 110. For example the programming server 120 may be enabled to provide digital media storage services, digital media management services, subscription services (e.g., streaming digital media subscription services), digital media provisioning services (e.g., selling, transcoding and/or downloading digital media) and/or digital media queuing services (e.g., programming a dynamic digital media queue).

The programming server 120 may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC) with electronic devices, such as, for example, the electronic device 110. The programming server 120 may be enabled to process, store, manage and/or communicate data and/or messages relevant to providing digital media services to electronic devices, such as, for example, the electronic device 110. Furthermore, the programming server 120 may be operable to provide communication services to and from the electronic device 110, the digital media database 130 and/or the personal digital media library 140. For example, the programming server 120 may include one or more transceivers for providing wired and/or wireless communication of data to and from the electronic device 110, the digital media database 130 and/or the personal digital media library 140 via the communication network 150 and/or one or more of the communication links 151, 152, 153 and/or 154.

In an example embodiment of the disclosure, the programming server 120 may receive, store, manage and/or process information and/or data relating to user interactions (e.g., playing, purchasing, marking up or down as to indicate preferences and/or interests) with digital media items.

The programming server 120 may comprise a dedicated system and/or a general purpose system configured to provide digital media services (e.g., programming a dynamic digital media queue) to electronic devices, such as, for example, the electronic device 110. The disclosure, and/or any implementation(s) in accordance therewith, however, are not limited to any particular type of a programming server. The programming server 120 may, for example, comprise the programming server 200 as depicted and/or described with respect to FIG. 2.

The digital media database (DMDB) 130 may comprise suitable logic, circuitry, code, and/or interfaces that may be operable to store and/or manage a plurality of digital media items (DMIs) 132. In this regard, the digital media database 130 may be operable to store and/or manage the plurality of DMIs 132, digital playlists (e.g., dynamic digital media queue) comprising one or more of the plurality of the DMIs 132 and/or a play order. Even though the digital media database 130 is illustrated as being separate from the programming server 120, the disclosure may not be limited in this regard. More specifically, the digital media database 130 may be implemented as part of the programming server 120 and/or may correspond to, for example the digital media database 202(c) as depicted in and/or described with respect to FIG. 2.

The personal digital media library (PDML) 140 may comprise suitable logic, circuitry, code, and/or interfaces that may be operable to store and/or manage a plurality of personal digital media items (PDMIs) 142. In this regard, the personal digital media library 140 may be operable to store and/or manage the plurality of PDMIs 142, digital playlists (e.g., dynamic digital media queue) comprising one or more of the plurality of the PDMIs 142 and/or a play order. The PDML 140 may store and/or manage play, purchase and/or interaction history associated with the PDMIs 142. Even though the personal digital media library 140 is illustrated as being separate from the electronic device 110, the disclosure may not be limited in this regard. More specifically, the personal digital media library 140 may be implemented as part of the electronic device 110. Even though the personal digital media library 140 is illustrated as being separate from the programming server 120, the disclosure may not be limited in this regard. More specifically the personal digital media library 140 may be, for example, hosted in a cloud based storage provided, managed and/or supported by the programming server 120 and/or may be assessable to a user associated with the personal digital medial library 140 from any electronic device, such as, for example, the electronic device 110.

The communication network 150 may comprise any combination of wired and/or wireless protocols, standards and/or interfaces (e.g. Ethernet, Bluetooth, WiFi, satellite and/or cellular network, WiMAX, WLAN, NFC) that enable communication between electronic devices, such as, for example, the electronic device 110, the programming server 120, the digital media database 130 and/or the personal digital media library 140.

In an example embodiment of the disclosure, the system 100 may program a dynamic digital media queue (e.g., a playlist) and/or may present the dynamic digital media queue to a user of an electronic device, such as, for example, the electronic device 110. In this regard, the programming server 120 may receive a request from the electronic device 110 to send, to the electronic device 110, a new and/or to update an existing dynamic digital media queue. The request may be sent to the programming server 120, from the electronic device 110, when, for example, the user of the electronic device accesses a personal digital media library, such as, for example, the PDML 140, through, for example, an application running on the electronic device 110 (e.g., a media player application, a web browser application, a media store application). The programming server 120 may receive and/or process the request. In this regard, the programming server 120 may determine a recommended digital media queue based on the request. For example, the programming server 120 may determine a current date and/or a current physical location of the electronic device 110 (or receive, from the electronic device 110, information and/or data relating to the physical location of the electronic device 110). The programming server 120 may determine a recommended digital media queue, based on, for example, the current date and the physical location of the electronic device 110.

In an example embodiment of the disclosure, the electronic device 110 may send a request to the programming server 120 for a dynamic digital media queue in response to a pre-defined event and/or a pre-defined user interaction. For example, the electronic device 110 may send the request when a user of the electronic device 110 accesses a personal digital media library, such as, for example, the PDML 140, through, for example, a media player application, a web browser application, and/or a media store application. In response to the request, the programming server 120 may determine and/or present (and/or cause to be presented on the electronic device 110) a recommended digital media queue to the user of the electronic device 110. In an example embodiment of the disclosure, the programming server 120 may designate one or more criteria based on which a user of the electronic device 110 may be presented with the recommended digital media queue. The criteria may include, for example, a lapse of a predetermined amount of time (between pre-defined user interactions, e.g., accessing a personal media library, interacting with any particular DMI or DMIs, etc.), a pre-defined user action (e.g., request for a dynamic digital media queue, such as, for example, "Now Playlist!" which may be based on a current date and/or physical location of the electronic device 110).

In an example embodiment of the disclosure, the programming server 120 may provide and/or manage user registration and/or authentication services. In this regard, a user of an electronic device, such as, for example, the electronic device 110, may register with the registration/authentication services provided by the programming server 120, by for example creating a user account. The user may register one or more electronic devices under the user account. The programming server 120 may provide user authentication services. For example, the programming server 120 may provide a prompt to the user to enter authentication information on the electronic device 110 through a graphical user interface (GUI). The electronic device 110 may send the authentication information to the programming server 120 for authenticating the user.

In an example embodiment of the disclosure, the programming server 120 may automatically authenticate the user or an electronic device associated with the user, such as, for example, the electronic device 110, when the electronic device 110 itself (e.g., without the user's intervention) or the user through the electronic device 110 sends a request for the programming server 120 to program a dynamic digital media queue. In this regard, when the programming server 120 receives the request, the programming server 120 may verify the identity of the electronic device 110. The programming server 120 may initiate and/or perform a search on a user registration database to determine whether the electronic device 110 corresponds to a particular user and authenticate the particular user based on the correspondence.

In operation, a user of an electronic device, such as, for example, the electronic device 110 may interact with a personal digital media library, such as, for example, the PDML 140. The electronic device 110, in response to user interactions (e.g., accessing an application that provides access to the digital content of the PDML 140, playing and/or purchasing digital content, etc.) may send a request for a dynamic digital media queue to a programming server, such as, for example, the programming server 120. The programming server 120 may, in response to the request, determine a recommended digital media queue. The programming server 120 may determine a current date and/or a physical location of the electronic device 110. In an example embodiment of the disclosure, the programming server may determine and/or analyze PDMIs, such as, for example, the PDMIs 142 in the PDML 140. The programming server 120 may determine a recommended digital media queue based on, for example, the current date, the physical location of the electronic device 110 and/or the analysis of the PDMIs 142. The programming server 120 may send, to the electronic device 110, recommendation data. The recommendation data may comprise the recommended digital media queue, a request for the electronic device 110 to present (or instructions on how to cause to be presented) the recommended digital media queue to the user. In an example embodiment of the disclosure, the recommendation data may comprise data indicative of one or more reasons explaining why particular digital content was included on the recommended digital media queue. The electronic device 110 may present and/or cause to be presented the recommended digital media queue to the user of the electronic device 110.

In an example embodiment of the disclosure, the programming server 120 may determine a recommended digital media queue based on a physical location of an electronic device, such as, for example, the electronic device 110. For example, the programming server 120 may determine that the electronic device 110 is associated with a particular physical location, e.g., Location A. The determination may be based on information and/or data received by the programming server 120, from the electronic device 110. The information and/or data may include a history and/or a statistical aggregate approximation of a most common physical location in which the electronic device 110 is typically used ("home location"). The information and/or data may include user supplied information, such as, for example, a home location (e.g., a city, region, etc.). The programming server 120 may determine that the current physical location of the electronic device is different than the home location and may determine a recommended digital media queue that corresponds to the physical location of the electronic device 120. For example, a user of the electronic device 110 may be visiting Location B for a first time and may be interested in digital media content (e.g., listening, discovering, purchasing songs, video and/or albums) associated with Location B. The recommended digital media queue may, for example, include digital media items (DMIs) associated with Location B (e.g., Artist C was born in Location C; Location B is associated with a specific genre of music). For example, Location B may correspond to a particular city, such as, for example, Seattle, which may be associated with grunge music genre, or New York, which may be associated with folk, sixties and/or coffeehouse music genres and/or Texas, which may be associated with country music genre. In this regard, Location B may be associated with one or more music genres. Also, a specific music genre may not be limited to any particular location, such as, for example, Location B.

In an example embodiment of the disclosure, the programming server 120 may determine personal digital media items, such as, for example, the PDMIs 142 from the user's personal digital media library, such as, for example, the PDML 140, in order to determine the user's interests. In this regard the programming server 120 may determine, for example, that the user's PDML 140 includes relatively many PDMIs 142 by Artist D. The programming server 120 may also determine that, for example, there is an upcoming concert by Artist D in Location B. The programming server 120 may determine recommended DMIs by Artist D and may cause the recommended DMIs by Artist B to be included on the recommended digital media queue. The programming server 120 may send recommendation date, including, for example, the recommended digital media queue to the electronic device 110 (and/or instructions on how to retrieve, create and/or present the recommended digital media queue to the user on the electronic device 110) and/or one or more reasons indicative of why particular recommended DMIs were included on the recommended digital media queue. For example, the reasons may include an explanation for including particular recommended DMIs by Artist D on the recommended digital media queue explaining that there is an upcoming concert by Artist D in Location B. In an example embodiment of the disclosure, the programming server 120 may send to the electronic device 110 and/or enable the electronic device 110 to provide purchasing option for the user, to for example, buy tickets to the upcoming concert by Artist D in Location B.

In an example embodiment of the disclosure, the recommended DMIs on the recommended digital media queue may include one or more PDMIs, such as, for example, PDMIs 142, from user's PDML 140 and/or one or more DMIs, such as, for example, DMIs 132. The included DMIs 132 may not be the same as (and/or corresponding to) the PDMIs 142 in the user's PDML 140. For example, the programming server 120 may determine a recommended digital media queue that comprises digital media items only from user's PDML 140, only from DMDB 130 (DMIs that are not found in, and/or do not correspond to any PDMIs 142 in PDML 140) or from both user's PDML 140 and the DMDB 130. In this regard, the user of the electronic device 110 may be presented with a recommended digital media queue that comprises digital media items that the user owns (e.g., may be found in the PDML 140) and digital media items that the user does not own (e.g., may not be found in the PDML 140) and may be interested in purchasing and/or sampling (e.g., listing, viewing or otherwise interacting with a sample of a digital media item).

Figure 2:
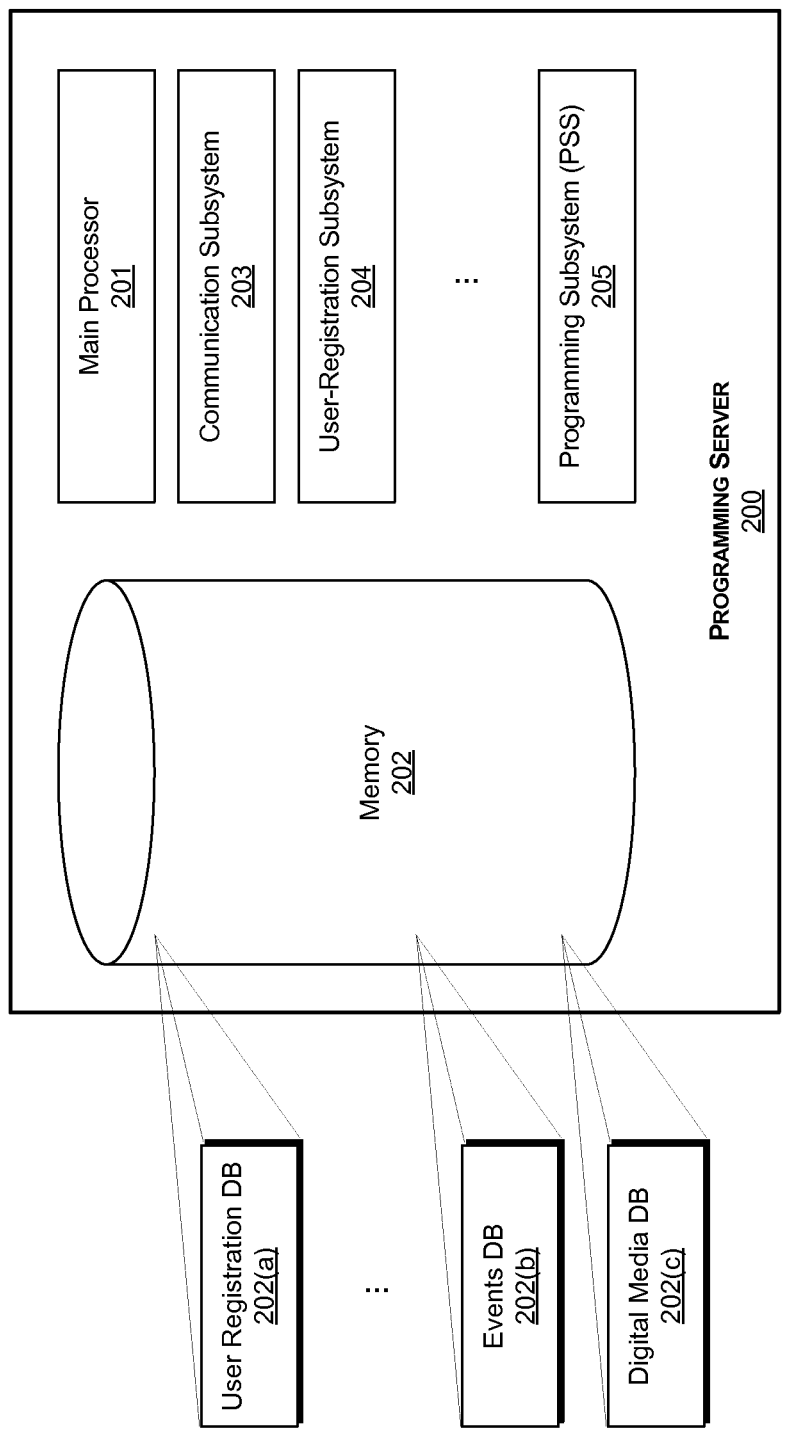
FIG. 2 is a block diagram of example programming server that supports programming a dynamic digital media queue, in accordance with an example embodiment of the disclosure.

FIG. 2 is a block diagram of example programming server that supports programming a dynamic digital media queue, in accordance with an example embodiment of the disclosure. Referring to FIG. 2, there is shown a programming server 200.

The programming server 200 may comprise suitable logic, circuitry, code, and/or interfaces that may be operable to implement various aspects of the disclosure. In this regard, the programming server 200 may correspond to the programming server 120 of FIG. 1. The programming server 200 may, for example, comprise a main processor 201, a memory 202, a communication subsystem 203, a user registration subsystem 204, and/or a programming subsystem 205.

The main processor 201 may comprise suitable circuitry, interfaces, logic, and/or code that may be operable to process data, and/or control and/or manage components, operations and/or functions of the programming server 200, and/or tasks performed therein. In this regard, the main processor 201 may configure and/or control operations of various components and/or subsystems of the programming server 200, such as, for example, for example, the memory 202, the communication subsystem 203, the user registration subsystem 204, and/or the programming subsystem 205, by utilizing, one or more control signals.

The memory 202 may comprise suitable logic, circuitry, interfaces, and/or code that that may be operable to enable permanent and/or non-permanent storage, buffering, and/or fetching of data, code and/or other information, which may be used, consumed, and/or processed by the components of the programming server 200. In this regard, the memory 202 may be enabled to store executable instructions to manage and/or configure, for example, the main processor 201, the communication subsystem 203, the user registration subsystem 204, and/or the programming subsystem 205. The memory 202 may store, for example, configuration data, which may comprise parameters and/or code, comprising software and/or firmware. The memory 202 may comprise different memory technologies, including, for example, read-only memory (ROM), random access memory (RAM), low latency nonvolatile memory, flash memory, solid-state drive (SSD), field-programmable gate array (FPGA), and/or other suitable electronic data storage capable of storing data, code and/or other information.

The memory 202 may comprise one or more databases such, as for example, a user registration database 202(a), an events database 202(b) and/or a digital media database 202(c).

The user registration database 202(a) may comprise a plurality of entities each corresponding to a particular user of digital media services, such as, for example the digital media services provided by the programming server 200. In this regard, each entity may comprise information and/or data, such as, for example, user name, account password, information about electronic devices associated with the user (e.g., type, brand, model, name, phone number, serial number) and/or other information voluntarily submitted by the user (e.g., age, gender, digital content preferences).

The events database 202(b) may comprise a plurality of entities each corresponding to current and historical events, such as, for example, concerts, album releases, artist birthday, artist anniversaries, news stories, etc. The entities may be associated with, for example, a particular artist and/or band, a particular physical location (e.g., city, neighborhood, region) and/or a particular date. The entities in the events database 202(b) may be stored and/or retrieved based on, for example, a particular artist and/or band. In this regard, the entities may comprise artist and/or band specific current and/or historical events (e.g., birthdays, anniversaries, upcoming concerts and/or song, video and/or album releases, etc.). The entities in the events database 202(b) may be stored and/or retrieved based on, for example, a physical location. In this regard, the entities may comprise location specific artists, bands, concerts, and/or other current and historical events. For example, if Artist A was born in city A, Artist A may be associated with a physical location corresponding to city A. The entities in the events database 202(b) may be stored and/or retrieved based on, for example, a current date. In this regard, the entities may comprise current events (e.g., news stories, upcoming or current concerts and/or song, video and/or album releases, etc.) or historical events associated with a particular date (e.g., artist's birthday, anniversary, etc.).

The digital media database 202(c) may comprise a plurality of entities each corresponding to a digital media item (DMI). The digital media database 202(c) may be substantially similar to, for example, the digital media database 130 as depicted in and/or described with respect to FIG. 1.

The communication subsystem 203 may comprise suitable logic, circuitry, interfaces, and/or code that may be operable to communicate data from and/or to the programming server 200, such as via one or more wired and/or wireless connections. For example, the communication subsystem 203 may comprise one or more transceivers for providing wired and/or wireless communication of data. The communication subsystem 203 may be configured to support one or more wired and/or wireless protocols, standards and/or interfaces (e.g., Ethernet, Bluetooth, WiFi, satellite and/or cellular network, WiMAX, WLAN, NFC) facilitating transmission and/or reception of signals to and/or from the programming server 200, and/or processing of transmitted or received signals in accordance with applicable wired or wireless protocols. In this regard, signal-processing operations may comprise filtering, amplification, analog-to-digital conversion and/or digital-to-analog conversion, up-conversion/down-conversion of baseband signals, encoding/decoding, encryption/decryption, and/or modulation/demodulation.

The user registration subsystem 204 may comprise suitable logic, circuitry, interfaces, and/or code that may be operable to communicate, process and/or manage user registration and/or authentication requests and/or device registration and/or authentication requests. In this regard, the user registration subsystem 204 may be operable to manage user accounts (e.g., create and/or store new user accounts, access, store, update, modify and/or mange existing user accounts), mange user devices (e.g., add, delete, modify, authorize, de-authorize and/or manage devices associated with a particular user account). The registration subsystem 204 may access, manage and/or process data in a user registration database, such as, for example, the user registration database 202(a). For example, upon receiving a request to create a new user account, the user registration subsystem 204 may create a data entity in the user registration database 202(a).

The programming subsystem (PSS) 205 may comprise suitable logic, circuitry, interfaces, and/or code that may be operable to program a dynamic digital media queue (e.g., a playlist). The PSS 205 may be operable to present or cause to be present a recommended digital media queue to a user of an electronic device. The PSS 205 may comprise a location module, an events module and/or a digital queue module as depicted in and/or described with respect to FIG. 3. The PSS 205 may provide location determination services. For example, the PSS 205 may receive information and/or date from an electronic device indicative of the physical location of the electronic device and/or information and/or data allowing the PSS 205 to determine a current physical location of the electronic device. The PSS 205 may provide event determination services. For example, the PSS 205 may perform a search of a database (a database native to the programming server 200 and/or a third-party database) and/or a search utilizing a native and/or a third-party search engine (though an application programming interface, plug-in, etc.) based on, for example, a current date and the determined current physical location. The PSS 205 may determine current and/or historical events based on the search. The PSS 205 may provide digital media queue services, such as, for example, sending, receiving, programming and/or processing a digital media queue (e.g. a playlist). The digital media queue services may be provided, for example, based on the determined current and/or historical events associated with a current date and/or the current physical location of the electronic device.

In operation, the programming server 200 may be operable to receive from an electronic device such as, for example, the electronic device 110, a request for a dynamic digital media queue. In this regard, the communication subsystem 203 may receive and/or process the request. The PSS 205, in response to the request, may determine a current date and/or a current physical location of the electronic device 110. The PSS 205 may determine current and/or historical events associated with the current date and/or the current physical location of the electronic device 110. Based on the current and/or historical events, the PSS 205 may initiate a search in an events database, such as, for example, the events database 202(b). The PSS 205 may initiate a search in a digital media database, such as, for example, the digital media database 202(c) to determine one or more digital media items (DMIs) based on the current and/or historical events. The PSS 205 may determine recommended DMIs from the determined DMIs. The PSS 205 may request from the communication subsystem 203 for the communication subsystem 203 to send to the electronic device 110 recommendation data, which may comprise a recommended digital media queue comprising, for example, the recommended DMIs.

In an example embodiment of the disclosure, the PSS 205 may initiate a search in a use registration database, such as, for example, the user registration database 202(*a*) to determine a particular user associated with the electronic device 110. The PSS 205 may determine recommended DMIs from the determined DMIs based on, for example, the contents (e.g., personal digital media items, such as, for example PDMIs 142) of a personal digital media library, such as, for example, the PDML 140, associated with the particular user.

In an example embodiment of the disclosure, the programming server 200 may be operable to determine a physical location of an electronic device, such as, for example, the electronic device 110, as depicted in and/or described with respect to FIG. 1. In this regard, the programming server 200 may be operable to receive and/or process various positional or locational signals, such as, for example, signals generated by GPS, GNSS, BT, BTL, BTLE and/or other sensors associated with electronic devices. The programming server 200 may be operable to receive and/or process signals from, for example, cellular towers and/or satellites to determine a physical location of an electronic device.

The components of the programming server 200, such as for example, the main processor 201, the memory 202, the communication subsystem 203, the user registration subsystem 204, and/or the programming subsystem 205 may be implemented in an integrated or a distributed system. An integrated system may be implemented, for example, on one computer, server, machine or device, where the integrated system may be configured to perform some or all of the functions, features and/or operations of the main processor 201, the memory 202, the communication subsystem 203, the user registration subsystem 204, and/or the programming subsystem 205 as described herein. A distributed system may be implemented with multiple components (e.g., computers, servers, machines and/or devices), where each of the multiple components may be configured to perform some or all of the functions, features and/or operations of the main processor 201, the memory 202, the communication subsystem 203, the user registration subsystem 204, and/or the programming subsystem 205 as described herein. Each function, feature and/or operation may be implemented on one or more of the components of the distributed system. For example, a specific feature, function and/or operation may be implemented only one component of the distributed system or it may be implemented across multiple components of the distributed system.

Figure 3:
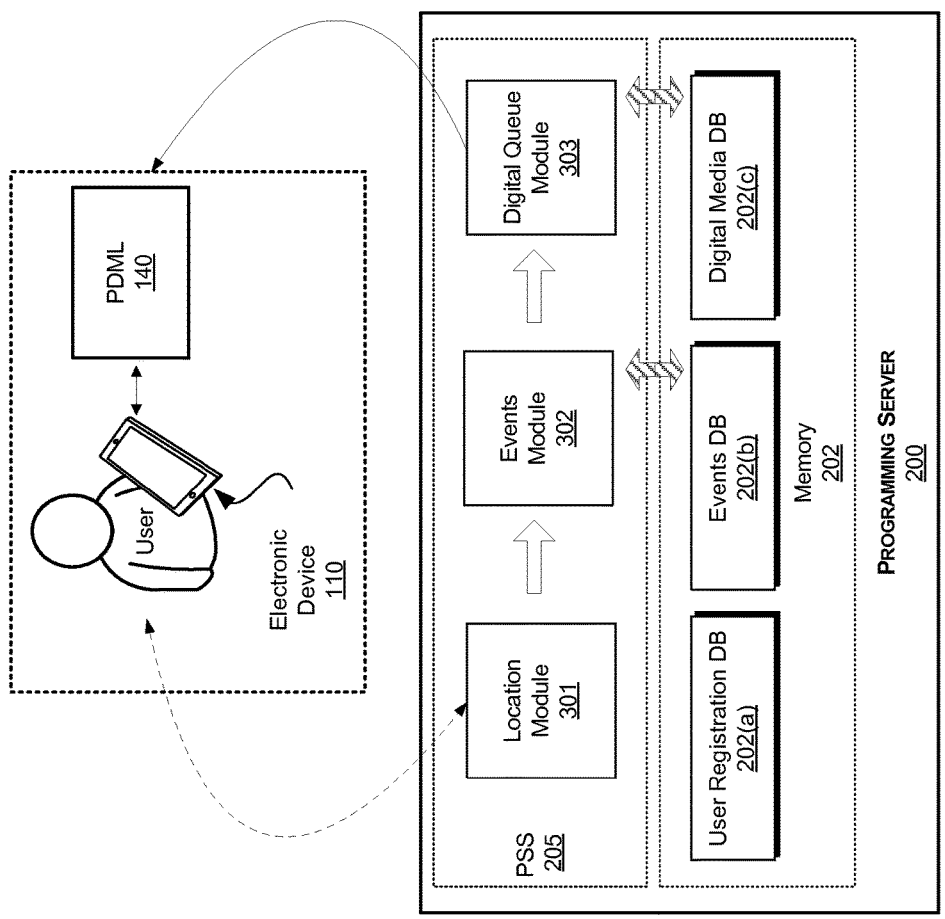
FIG. 3 is a block diagram of example process of programming a dynamic digital media queue by a programming server, in accordance with an example embodiment of the disclosure.

FIG. 3 is a block diagram of example process of programming a dynamic digital media queue by a programming server, in accordance with an example embodiment of the disclosure.

The PSS 205 may comprise a location module 301, an events module 302 and/or a digital queue module 303. The location module 301 may comprise suitable logic, circuitry, code, and/or interfaces that may be operable to determine a physical location of an electronic device, such as the electronic device 110 and/or to receive, send and/or process physical location information and/or data to and from the electronic device 110. In this regard, to receive and/or process various positional or locational signals, such as, for example, signals generated by GPS, GNSS, BT, BTL, BTLE and/or other sensors associated with the electronic device 110. For example, the location module 301 may determine the location of the electronic device 110 based on one or more such signals. In another example, the location module 301 may be operable to receive data from the electronic device 110 comprising physical location information and/or data and may, based on the information and/or data, determine a physical location of the electronic device 110.

The events module 302 may comprise suitable logic, circuitry, code, and/or interfaces that may be operable to determine current and historical events. In this regard, the events module may be operable to determine a current date and/or receive from the location module 301 physical location information and/or data. Based on, for example, the current date and/or physical location information and/or data, the events module 302 may determine one or more events, such as, for example, birthdays, anniversaries, concerts, announcements and/or other information and/or data relating to, for example, an artist or a band. The digital queue module 303 may comprise suitable logic, circuitry, code, and/or interfaces that may be operable to create, modify and/or process digital media queues (e.g., a playlist).

Referring to FIG. 3, there is shown an electronic device 110, a personal digital media library (PDML) 140 and a programming server 200.

In operation, the programming server 200 may receive a request from the electronic device 110 for a dynamic digital media queue. In response to the request, the PSS 205 may determine a particular user associated with the electronic device 110 by initiating a search in the user registration database 202(*a*). Also in response to the request, the location module 301 may determine a current physical location of the electronic device 110 (or may request and/or receive from the electronic device information and/or date indicative of the current physical location of the electronic device 110).

The location module 301 may communicate with the events module 302 and may request from the events module 302 for the events module 302 to determine one or more current and/or historical events based on a current date and/or the current physical location of the electronic device 110. In this regard, the events module may initiate a search of current and/or historical events in the events database 202(*b*).

The events module 302 may communicate with the digital queue module 303 and may request from the digital queue module 303 to determine one or more digital media items (DMIs) based on the one or more current and/or historical events. In this regard, the digital queue module 303 may initiate a search of DMIs in the digital media database 202(*c*). The digital queue module 303 may determine a recommended digital media queue, which may include one or more of the one or more DMIs.

In an example embodiment of the disclosure, the digital queue module 303 may determine and/or analyze a personal digital media library associated with the particular user (as determined by the programming server 200), such as, for example the PDML 140, and may analyze the contents of the PDML 140 (e.g., personal digital media items). The digital queue module 303 may, based on the analysis, determine one or more recommended DMIs from, for example, the previously determined DMIs. The digital queue module 303 may determine a recommended digital media queue, which may include one or more of the one or more DMIs.

The programming server 200 may send to the electronic device 100 recommendation data, in response to the request for a dynamic digital media queue. The recommendation data may comprise the recommended digital media queue as determined by the digital queue module 303.

Figure 4:
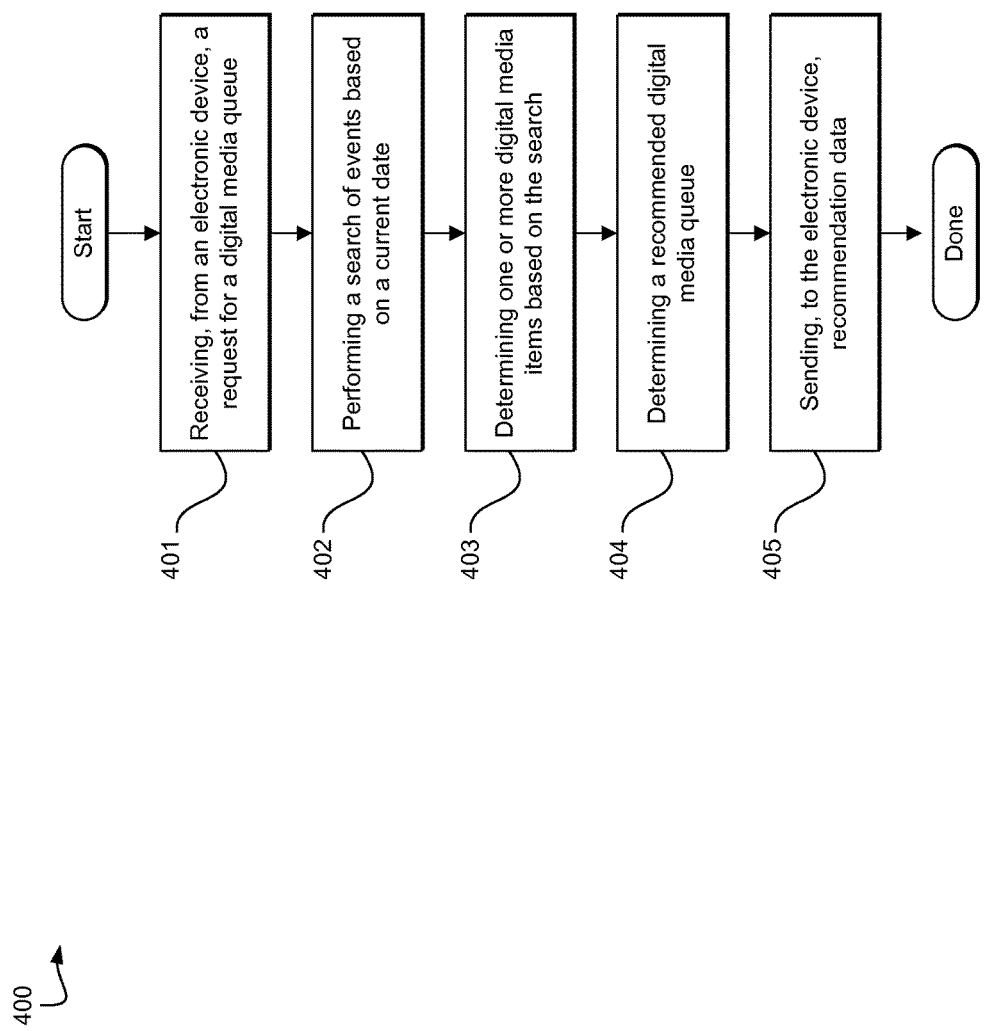
FIG. 4 is a flow diagram of example steps of a method for programming a dynamic digital media queue, in accordance with an example embodiment of the disclosure.

FIG. 4 is a flow diagram of example steps of a method for programming a dynamic digital media queue, in accordance with an example embodiment of the disclosure. Referring to FIG. 4, an example method 400 is shown comprising a plurality of example steps for programming a dynamic digital media queue.

In example step 401, a request for a digital media queue may be received from an electronic device. In this regard, the programming server, such as, for example, the programming server 200 may receive from an electronic device, such as, for example, the electronic device 110, request data. The request data may, for example, be generated by an application running on an electronic device (e.g., media player application, web-browser application) in response to, for example, a pre-defined event. In an example embodiment of the disclosure, a particular application, supporting generating a request for a digital media queue, may run on the electronic device and may generate the request data in response to a pre-defined criterion, such as for example, a user direct action (e.g., requesting a recommended playlist (e.g., the "Now Playlist!")) and/or a user indirect action (e.g., opening a list of playlists in a media player application, accessing a media store in a web browser application), and/or other pre-defined criterion (e.g., laps of a pre-determined amount of time, electronic device requested or logged in to one of services provided by the programming server 200 from, for example, a new geographical location). The programming server 200 may receive and/or process the request data in response to the request from the electronic device 110.

In example step 402, a search of events may be performed based on a current date. In this regard, the programming server 200 may initiate a search in an events database, such as, for example, the events database 202(b). The search may be based on a current date as determined at the time of the request received in the example step 401.

In an example embodiment of the disclosure, the programming server 200 may determine a current location of the electronic device from which the request in the example step 401 was received. In another example embodiment of the disclosure, the information and/or data about a current location of the electronic device may be received as part of the request in the example step 401. The search of events may be performed based on the current location of the electronic device and/or current date. For example, if the current location of the electronic device is, for example, a particular city, and the current date is for example, Oct. 9, 2011, the programming server 200 may initiate a search on the events database 202(a) using the particular city and the Oct. 9, 2011 date as inputs for the search.

Based on the search, the programming server 200 may determine one or more events associated with the particular city and/or the Oct. 9, 2011 date. The events may include, for example, music concerts, birthdays, anniversaries, current and historical events and/or news.

For example, the programming server may determine a list of upcoming music concerts in the particular city within a predetermined time from the Oct. 9, 2011 date (e.g., within 2 months) or a list of upcoming concerts of an artist associated with the particular city (e.g., was born, lived, favors the particular city) where the concerts may, for example, be scheduled to occur in a city different that the particular city. In another example, the programming server 200 may determine that, for example, Artist A, Artist B and/or Artist C were all born (or died) on October 9. In yet another example, the programming server 200 may determine current news on Oct. 9, 2011, such as, for example, a discovery of a new planet, a political event, a musical event and/or any other event (e.g., a child was born to an artist) that may be used in determining a recommended digital media queue, such as the recommended digital media queue described with respect to the example step 404. In yet another example, the programming server 200 may determine that, for example, Artist D and/or E is each associated with the particular city (e.g., was born, lived, favors the particular city).

In example step 403, one or more digital media items (DMIs) may be determined based on the search performed according to the example step 402. The programming server 200 may initiate a search on a digital media database, such as, for example, the digital media database 202(c) (or the digital media database 130) based on the events determined in the example step 402. For example, if the programming events included, for example, a concert by Artist F in the particular city, a birthday of Artist G on October 9 and/or an announcement of a discovery of a new planet, the programming server 200 may initiate a search on the digital media database 202(c) (or the digital media database 130) for DMIs associated with Artist F (and Artist F's upcoming concert, e.g. DMIs promoting Artist F's new songs and/or videos), for DMIs associated with Artist G (e.g., popular songs and/or videos by Artist G, including for example, best known hits, most recent hits, etc.) and/or for DMIs related to discovery of a new planet (e.g., song and/or video that are thematically related to, for example, space, planets, etc.).

In example step 404, a recommended digital media queue may be determined. In this regard, the programming server 200 may determine one or more recommended digital media items (recommended DMIs) based on the one or more digital media items determined in the example step 403. For example, the programming server 200 may determine a pre-defied number of DMIs to be included as the recommended DMIs on the recommended digital media queue. The programming server 200 may prioritize DMIs based on category. For example, the DMIs associated with Artist G may have a higher priority than DMIs associated with Artist F. The priority may be based on one or more pre-defined criteria (e.g., a current promotion relating to a particular artist, preference of DMIs determined based on a date as opposed to the location, and vice versa, preference of DMIs determined based on a birthday than on a news event, etc.). The programming server 200 may further determine a play order for the recommended DMIs (e.g., preset, random, based on pre-defined criteria, including, for example, artist priority, event priority, etc.). The recommended digital media queue may comprise the recommended DMIs and the play order.

In an example embodiment of the disclosure, the programming server 200 may determine a particular user is associated with the electronic device from which the request in example step 401 was received. The programming server 200 may determine a personal digital media library (PDML), such as, for example, the PDML 140, comprising personal digital media items (PDMIs), such as, for example, the PDMIs 142, associated with the particular user and may analyze the PDML 140 (including, for example, a personal digital media items play history, purchase history and/or other user interactions with respect to the personal digital media items 142). The analysis of the PDML 140 may be one example criterion, in part, based on which the programming server 200 may determine the recommended DMIs. For example, the programming server 200 may compare the one or more DMIs determined in the example step 403 and the PDMIs 142 (some or all as determined through the analysis of the PDML 140). The comparison may include, for example, a comparison of similarity between the DMIs and the PDMIs 142 (e.g., same or similar artist, album, genre, etc.) in the particular user's PDML 140. The programming server 200 may sue a variety of digital media comparison methods (e.g., metadata comparison, song analysis, etc.) Based on the comparison, the programming server 200 may determine one or more recommend DMIs from the DMIs.

In another example embodiment of the disclosure, the programming server 200 may determine one or more recommended DMIs from the PDMIs 142 from a particular user's PDML 140.

In example step 405, recommendation data may be sent to the electronic device 110. The recommendation data may comprise the recommended digital media queue determined in the example step 404. In an example embodiment of the disclosure, the recommendation data may comprise one or more reasons explaining why the recommended DMIs were included on the recommended digital media queue. For example, an example recommended digital media queue may comprise DMI_1, DMI_2, DMI_3 and DMI_4. DMI_1 may be associated with Artist F, DMI_2 may be associated with Artist G, and DMI_3 and DMI_4 may be associated with the "discovery of a planet" event (an example association is illustrated in the example steps 403 and/or 404 above). The one or more reasons for the example recommended digital media queue may, for example, convey data and/or information indicating that, for example, DMI_1 was included because of an upcoming concert by Artist F in the particular city, DMI_2 was included because of a birthday of Artist G on October 9 and DMIs_3 and DMI_4 were included because of a discovery of a new planet.

It is to be understood that when contents (e.g., a queue, a playlist, a DMI) are sent, received, stored and/or processed as described herein, the contents may comprise the contents themselves (e.g., the actual digital media item and/or file corresponding to a particular digital media content being sent, received, stored and/or processed), pointers to the contents (e.g., identifies, IDs and/or pointers to an entity and/or item in, for example a database and/or a storage location corresponding to the particular digital media content being sent, received, stored and/or processed), a text file representative of the contents, a list of the contents and/or any other form that may allow a programming server, such as for example, the programming server 120 and/or 200, and/or an electronic device, such as, for example, the electronic device 110, to identify, determine and/or process the contents accordingly.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for programming a dynamic digital media queue.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
performing, based on data in a request, a search for an event;
determining, based on at least one of a history or a statistical approximation, a most common physical location of an electronic device that is a source of the request;
determining, based on a result of the search and the most common physical location of the electronic device, a playlist of at least one digital media item; and
sending, to the electronic device, the playlist.

2. The method of claim 1, wherein the result of the search comprises at least one of a release date for the at least one digital media item, a birthday of an individual associated with the at least one digital media item, an anniversary associated with the at least one digital media item, a release of a news story associated with the at least one digital media item, or a location and a date at which the individual is scheduled to appear.

3. The method of claim 1, wherein the performing is further based on a current date.

4. The method of claim 3, further comprising at least one of:
determining the current date; or
receiving, from the electronic device, the current date.

5. The method of claim 3, wherein at least one of:
the data in the request includes a current location of the electronic device; or
the method further comprises receiving, from the electronic device, the current location.

6. The method of claim 5, further comprising determining that the current location is different from the most common physical location, wherein the determining the playlist is further based on the current location.

7. The method of claim 5, further comprising sending, to the electronic device, a message that provides a reason that the playlist includes the at least one digital media item.

8. The method of claim 1, further comprising sending, to the electronic device, a message with an instruction about how to purchase the at least one digital media item.

9. The method of claim 1, further comprising determining a digital media library associated with a user of the electronic device, wherein the at least one digital media item of the playlist includes at least one digital media item from the digital media library.

10. The method of claim 9, further comprising analyzing the at least one digital media item from the digital media library, wherein the determining the playlist is further based on a result of an analysis of the at least one digital media item from the digital media library.

11. The method of claim 10, wherein the analyzing comprises identifying an entity associated with the at least one digital media item from the digital media library, and further comprising determining that the entity is scheduled to appear at a location at a date later than a current date.

12. The method of claim 1, wherein the sending the playlist comprises sending the playlist in response to at least one of a pre-defined user action or a lapse of a predetermined amount of time.

13. A non-transitory computer-readable medium storing computer code for controlling a processor to cause the processor to:
    perform, based on data in a request, a search for an event;
    determine, based on at least one of a history or a statistical approximation, a most common physical location of an electronic device that is a source of the request;
    determine, based on the search and the most common physical location of the electronic device, a playlist of at least one digital media item; and
    send, to the electronic device, the playlist.

14. The non-transitory computer-readable medium of claim 13, wherein the computer code for controlling the processor is further configured to cause the processor to:
    analyze the at least one digital media item by identifying an entity associated with the at least one digital media item from the digital media library; and
    determine that the entity is scheduled to appear at a location at a date later than a current date.

15. A system, comprising:
a processor configured to:
    perform, based on data in a request, a search for an event;
    determine, based on at least one of a history or a statistical approximation, a most common physical location of an electronic device that is a source of the request;
    determine, based on the search and the most common physical location of the electronic device, a playlist of at least one digital media item; and
    sending, to the electronic device, the playlist; and
a memory configured to store the request, the at least one of the history or the statistical approximation, and the playlist.

16. The system of claim 15, wherein:
the data in the request includes a current location of the electronic device, the current location being different from the most common physical location, and the processor is configured to determine the playlist further based on the current location; and
the processor is further configured to determine a current date and to perform the search based on the current date.

17. The system of claim 15, further comprising a communication subsystem configured to receive, from the electronic device, a current date and a current location, the current location being different from the most common physical location, wherein the processor is configured to perform the search based on the current date and to determine the playlist based on the current location.

18. The system of claim 17, wherein the communication subsystem if further configured to send, to the electronic device, a message that provides a reason that the playlist includes the at least one digital media item, the reason being based on at least one of the current date or the current location.

19. They system of claim 15, wherein the processor is further configured to:
    determine a digital media library associated with a user of the electronic device; and
    analyze the at least one digital media item from the digital media library, wherein the processor is further configured to determine the playlist based on a result of an analysis of the at least one digital media item from the digital media library, wherein the at least one digital media item of the playlist includes at least one digital media item from the digital media library.

20. The system of claim 19, wherein the processor is configured to analyze the at least one digital media item by identifying an entity associated with the at least one digital media item from the digital media library, and wherein the processor is further configured to determine that the entity is scheduled to appear at a location at a date later than a current date.

* * * * *